(12) United States Patent
Connelly et al.

(10) Patent No.: US 7,193,154 B1
(45) Date of Patent: Mar. 20, 2007

(54) ELECTRICAL SOCKET SHIM PLATE APPARATUS AND METHOD

(75) Inventors: Barry R. Connelly, Carmel, CA (US); Jessica Haynes, Carmel, CA (US)

(73) Assignee: Socket Saver Corporation, Salinas, CA (US)

( * ) Notice: Subject to any disclaimer, the term of this patent is extended or adjusted under 35 U.S.C. 154(b) by 0 days.

(21) Appl. No.: 11/255,858

(22) Filed: Oct. 20, 2005

(51) Int. Cl.
*H02G 3/14* (2006.01)
(52) U.S. Cl. .......................... 174/67; 174/66; 220/241; 220/242
(58) Field of Classification Search ................ 174/66, 174/67, 53, 58, 57; 220/241, 242, 3.2, 3.8; 439/135, 195, 137, 145, 136, 133, 139, 149, 439/894, 538; D13/156, 177, 154
See application file for complete search history.

(56) References Cited

U.S. PATENT DOCUMENTS

| 4,459,736 | A | * | 7/1984 | Judkins | 439/894 |
| 5,116,242 | A | * | 5/1992 | Scotti | 439/538 |
| D359,270 | S | * | 6/1995 | Connelly | D13/154 |
| 6,468,107 | B1 | * | 10/2002 | Nice et al. | 174/66 |
| 6,761,582 | B1 | * | 7/2004 | Shotey et al. | 174/66 |

* cited by examiner

*Primary Examiner*—Angel R. Estrada
(74) *Attorney, Agent, or Firm*—Cislo & Thomas LLP (57) ABSTRACT

An apparatus (100) and a method (M) for mechanically shimming an electrical socket comprising: a generally planar member (10) having a front surface (11) and a rear surface (12); a pair of shims (13) being formed on the rear surface (12); and a pair of primary orifices (14) being formed through the generally planar member (10) for accommodating an electrical plug.

30 Claims, 7 Drawing Sheets

ELECTRICAL SOCKET SHIM PLATE APPARATUS AND METHOD

CROSS-REFERENCE TO RELATED APPLICATIONS

This application is a nonprovisional patent application which relates to U.S. Design Pat. No. 359,270, entitled "Electrical Socket Shim," filed Sep. 19, 1994, and issued Jun. 13, 1995.

TECHNICAL FIELD

The present invention relates to apparatuses and methods for shimming electrical sockets. More particularly, the present invention relates to apparatuses and methods for mechanically shimming electrical sockets. Even more particularly, the present invention relates to apparatuses and methods for mechanically shimming a pair of electrical sockets.

BACKGROUND ART

The currently existing related art involves several apparatuses for use with electrical wall sockets. One such invention is a safety plug for preventing electrocution of small children and pets. This plug usually comprises two thick plastic prongs formed on a small plastic plate. The plug is inserted into an electrical wall socket, whereby a snug friction fit is formed between the electrical elements of the socket and the plastic prongs, whereby any possible electrical connection from the socket to the environment is prevented, and thereby providing small children and pets with a safer environment. While child safety plugs have their purpose, they indeed prevent handy electrical connection when otherwise desired.

Conversely, other related art apparatuses involve a connector or an adapter for either improving or preserving the electrical connection between any given socket and an electrical plug from a peripheral device. Such products typically comprise connectors or adapters which are electrically conductive and which function as an electrical interface or coupling to the socket. Specifically, these adapters or connectors, e.g., electrical buses, provide an electrical coupling between a primary electrical device and a secondary or peripheral electrical device. This electrical coupling indeed serves to prevent undue wear and tear on the conductive elements of the primary electrical device's electrical receptacle which would otherwise occur as a result of constant engaging and disengaging of the secondary electrical device's connector. However, the use of such adapters or connectors only serves provide another source of electrical failure and potentially alters the electrical characteristics between the primary device and the secondary device.

Thus, a long-felt need is seen to exist for an apparatus and a method for shimming electrical sockets. In particular, a long-felt need is seen to exist for an apparatus and a method for mechanically shimming electrical sockets, especially for mechanically shimming a pair of electrical sockets, such as are typically configured on a conventional electrical socket wall plate, without altering the electrical characteristics of the sockets.

DISCLOSURE OF THE INVENTION

The present invention addresses the foregoing problems in the current art in an apparatus and a method for mechanically shimming electrical sockets, especially for mechanically shimming a pair of electrical sockets, such as are typically configured on a conventional electrical socket wall plate, without altering the electrical characteristics of the sockets.

Basically, the present invention involves an apparatus for mechanically shimming an electrical socket, the apparatus comprising: a generally planar member having a front surface and a rear surface; a pair of shims being formed on the rear surface; and a pair of primary orifices being formed through the generally planar member for accommodating an electrical plug. The pair of shims may comprise two pairs of shims while the pair of primary orifices comprises two pairs of primary orifices. The pair of shims comprises at least one pair of tangs. The pair of primary orifices comprises a pair of slots. The pair of shims comprises an electrically non-conducting material such as a polymer material. The generally planar member also comprises an electrically non-conducting material such as a polymer material. The present apparatus further comprises a tap formed through the generally planar member for facilitating its fastening to the electrical socket. The present apparatus further comprises a secondary orifice, formed through the generally planar member and associated with the pair of primary orifices, for accommodating a ground member of the electrical plug. The front surface of the generally planar member comprises a beveled configuration. The rear surface of the generally planar member comprises a wall-socket conforming configuration.

The present invention also involves a corresponding method for mechanically shimming an electrical socket, the method comprising the steps of: providing a generally planar member having a front surface and a rear surface; forming a pair of shims on the rear surface; and forming a pair of primary orifices through the generally planar member for accommodating an electrical plug. The step of forming the pair of shims comprises forming two pairs of shims while the step of forming the pair of primary orifices comprises forming two pairs of primary orifices. The step of forming the pair of shims comprises forming a pair of tangs. The step of forming the pair of primary orifices comprises forming a pair of slots. The step of forming the pair of shims comprises using an electrically non-conducting material such as a polymer material. The step of providing the generally planar member comprises using an electrically non-conducting material such as a polymer material. The present method further comprises the step of forming a tap through the generally planar member for facilitating its fastening to the electrical socket. The present method further comprises the step of forming a secondary orifice through the generally planar member, associated with the pair of primary orifices, for accommodating a ground member of the electrical plug. The step of providing the generally planar member comprises forming a beveled configuration on the front surface. The step of providing the generally planar member comprises forming a wall-socket conforming configuration on the rear surface.

Advantages of the present invention include, but are not limited to: preserving the electrical coupling between an electrical socket, such as a wall socket, and an electrical plug, without altering the electrical characteristics of the coupling nor introducing another source of electrical failure; eliminating the need for replacement of an electrical socket; mechanically compensating for over-worn sockets; facilitating engagement and disengagement of the shims; and conforming to existing sockets for providing a lower profile shim plate. Other features of the present invention are disclosed, or are apparent, in the section entitled "Detailed Description of the Invention," disclosed, infra.

BRIEF DESCRIPTION OF THE DRAWINGS

For a better understanding of the present invention, reference is made to the below-referenced accompanying Drawings. Reference numbers refer to the same or equivalent parts of the present invention throughout the several figures of the Drawings.

MODES FOR CARRYING OUT THE INVENTION

Figure 1:
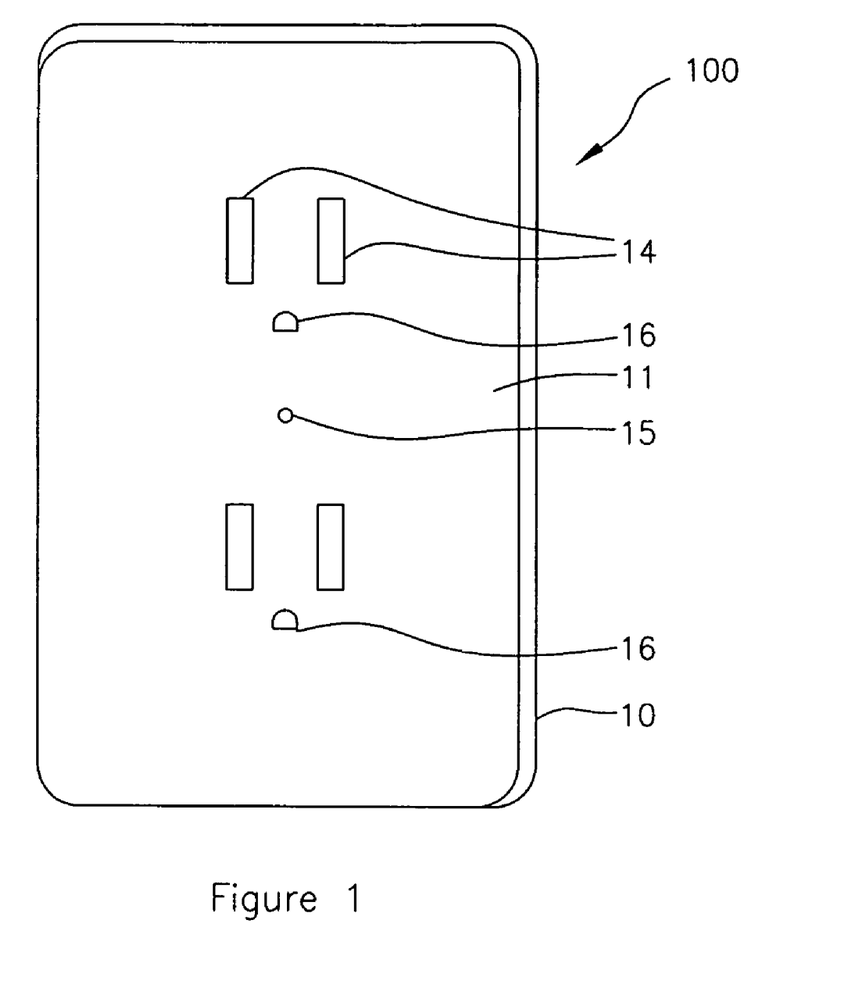
FIG. 1 is a perspective view of an electrical socket shim plate apparatus, showing a front surface of a generally planar member, in accordance with the present invention.
Figure 2:
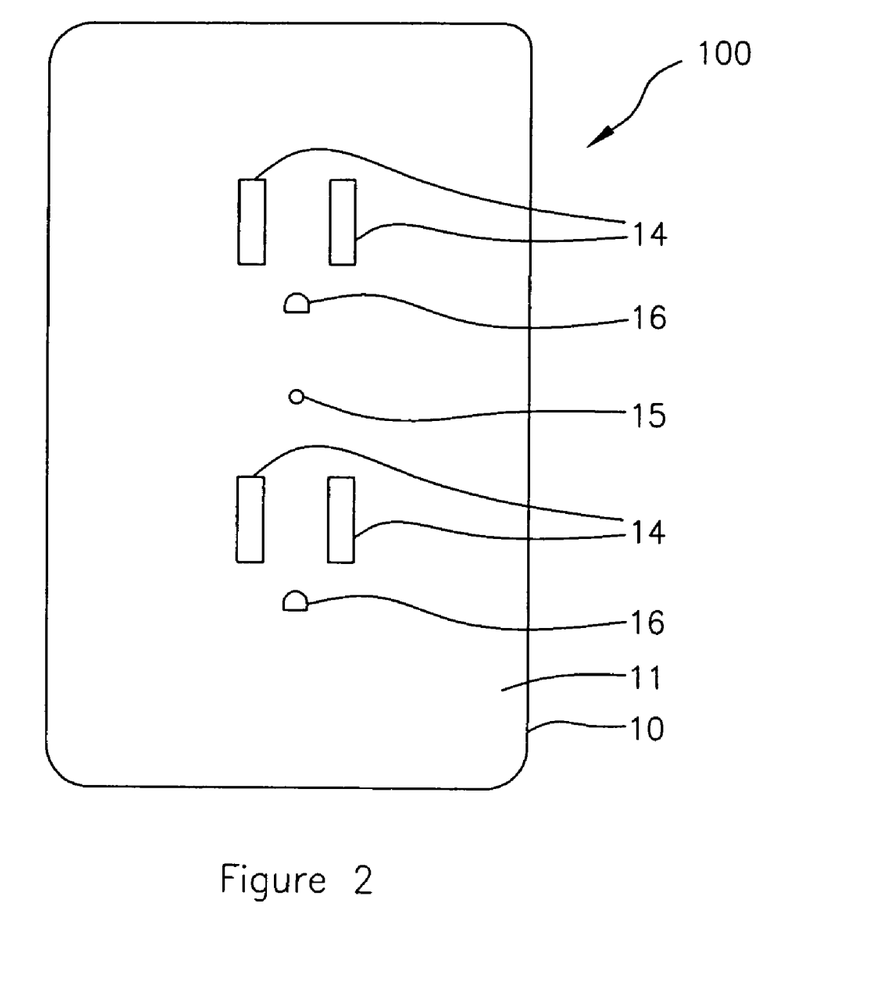
FIG. 2 is a front view of an electrical socket shim plate apparatus, showing a front surface of a generally planar member with primary orifices, in accordance with the present invention.

FIG. 1 illustrates, in a perspective view, an electrical socket shim plate apparatus 100 for mechanically shimming an electrical socket comprises: a generally planar member 10 having a front surface 11 and a rear surface 12 (not shown); a pair of shims 13 being formed on the rear surface 12 (not shown); and a pair of primary orifices 14 being formed through the generally planar member 10 for accommodating an electrical plug. The pair of shims 13 may comprise two pairs of shims while the pair of primary orifices 14 comprises two pairs of primary orifices (FIGS. 3–7). The pair of shims 13 comprises at least one pair of tangs (FIG. 3). The pair of primary orifices 14 comprises a pair of slots (FIGS. 1 and 2). The pair of shims 13 comprises a polymer material and a length which is longer than that of a standard electrical plug prong, preferably a length which is approximately ⅛ inch longer than that of a standard electrical plug prong. The generally planar member 10 also comprises a polymer material. The present apparatus 100 further comprises a tap 15 formed through the generally planar member 10 for facilitating its fastening to the electrical socket (FIGS. 1 and 2). The apparatus 100 can further comprises a fastener 17 (not shown) such as a screw or a bolt. The fastener 17 has a length which is longer than a standard wall plate fastener, preferably a length which is approximately ⅛ inch longer than that of a standard wall plate fastener. The present apparatus 100 further comprises a secondary orifice 16, formed through the generally planar member 10 and associated with the pair of primary orifices 14, for accommodating a ground member of the electrical plug (FIGS. 1 and 2). The front surface 11 of the generally planar member 10 comprises a beveled configuration (not shown). The rear surface 12 of the generally planar member comprises a wall-socket conforming configuration (not shown).

FIG. 2 illustrates, in a front view, an electrical socket shim plate apparatus 100, showing a front surface 11 of a generally planar member 10 with primary orifices 14, in accordance with the present invention.

Figure 3A:
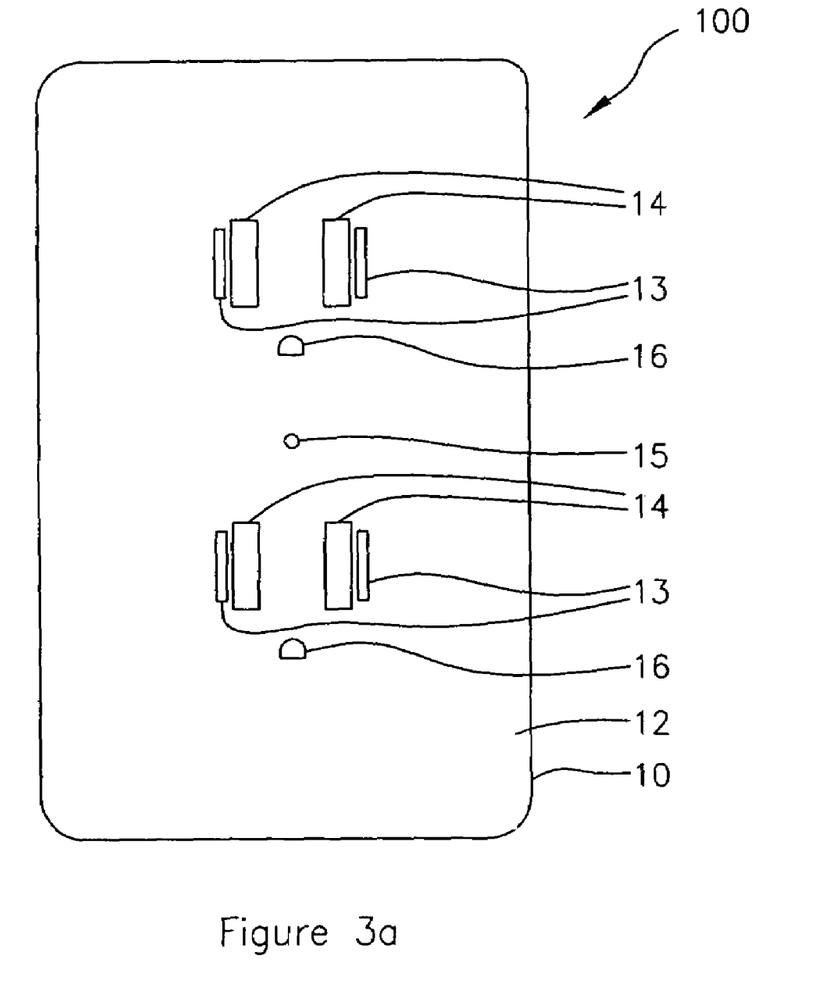
FIG. 3*a* is a rear view of an electrical socket shim plate apparatus, showing a rear surface of a generally planar member and the disposition of the shims in relation to the primary orifices, in accordance with the present invention.
Figure 3B:
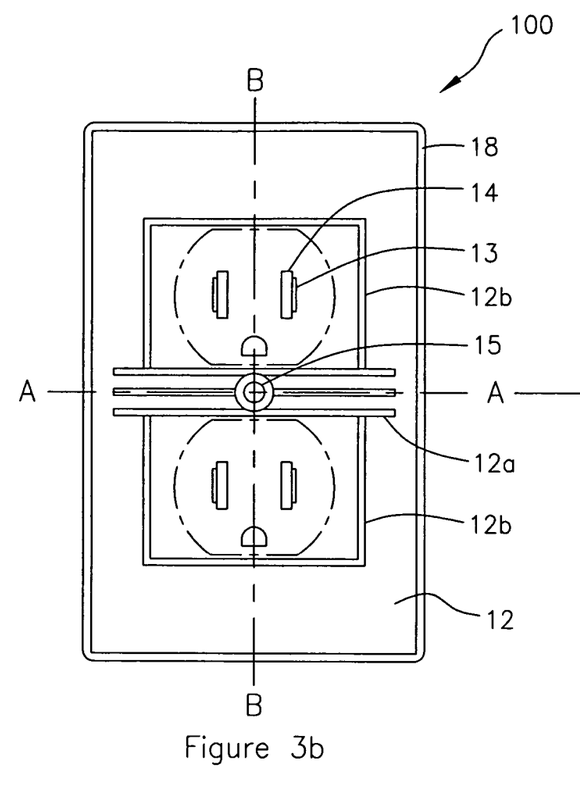
FIG. 3*b* is a rear view of the rear surface of the apparatus having a wall-socket conforming configuration as well as ribs and spars for providing additional structural integrity, in an alternative embodiment of the present invention.
Figure 3C:
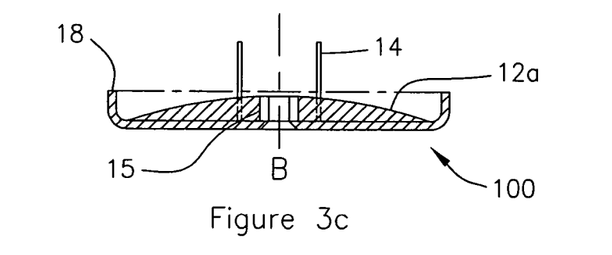
FIG. 3*c* is a cross-sectional view, showing the profile of the rib.
Figure 3D:
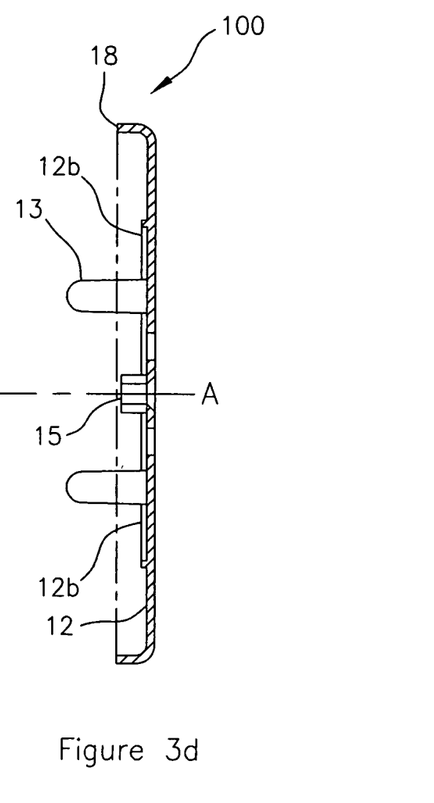
FIG. 3*d* is a cross-sectional view, showing the profile of the spar.

FIG. 3*a* illustrates, in a rear view, an electrical socket shim plate apparatus 100, showing a rear surface 12 of a generally planar member 10 and the disposition of the shims 13 in relation to the primary orifices 14, in accordance with the present invention. FIG. 3*b* shows, in a rear view, the rear surface 12 of the apparatus 100 having a wall-socket conforming configuration as well as ribs 12*a* and spars 12*b* for providing additional structural integrity (reinforcement), in an alternative embodiment of the present invention. The wall-socket conforming configuration comprises a perimeter lip 18 which conforms to the shape of a standard wall plate. FIG. 3*c* is a cross-sectional view taken through Section A—A, showing the profile of the rib 12*a*. FIG. 3*d* is a cross-sectional view taken through Section B—B, showing the profile of the spar 12*b*.

Figure 4:
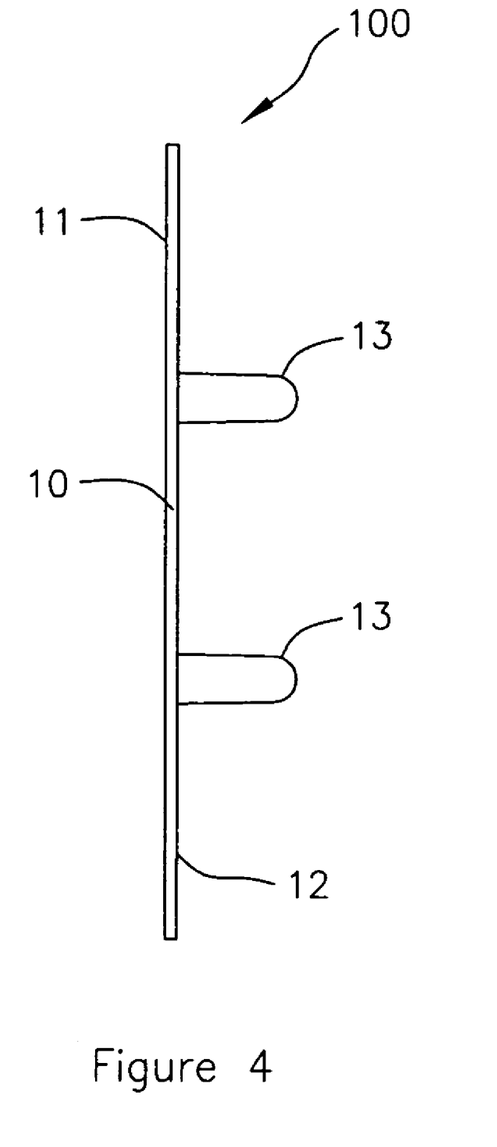
FIG. 4 is a side view of an electrical socket shim plate apparatus, showing the shims projecting from the rear surface of the generally planar member, in accordance with the present invention.

FIG. 4 illustrates, in a side view, an electrical socket shim plate apparatus 100, showing the shims 13 projecting from the rear surface 12 of the generally planar member 10, in accordance with the present invention.

Figure 5:
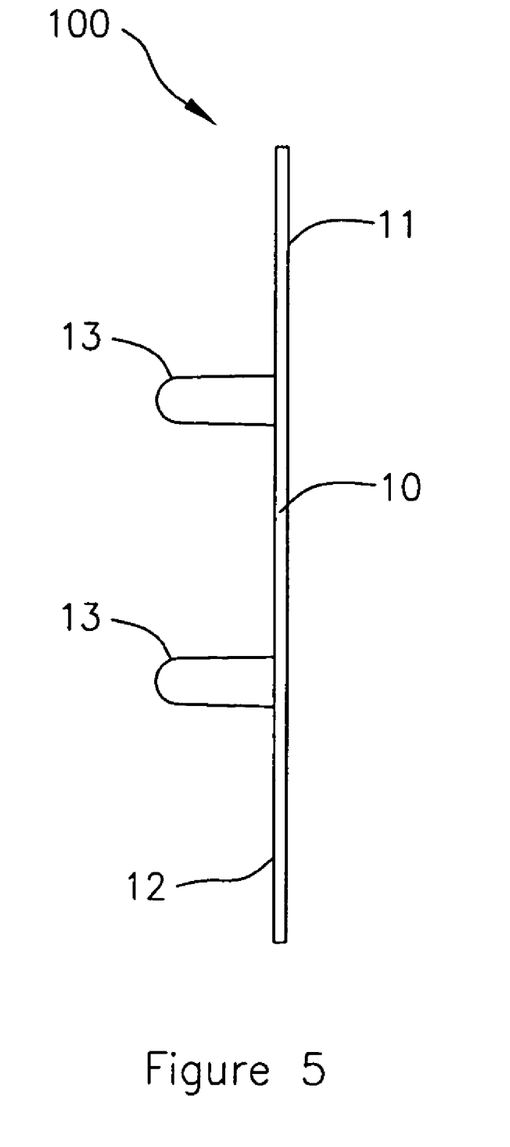
FIG. 5 is an opposing side view of an electrical socket shim plate apparatus, showing the shims projecting from the rear surface of the generally planar member, in accordance with the present invention.

FIG. 5 illustrates, in an opposing side view, an electrical socket shim plate apparatus 100, showing the shims 13 projecting from the rear surface 12 of the generally planar member 10, in accordance with the present invention.

Figure 6:
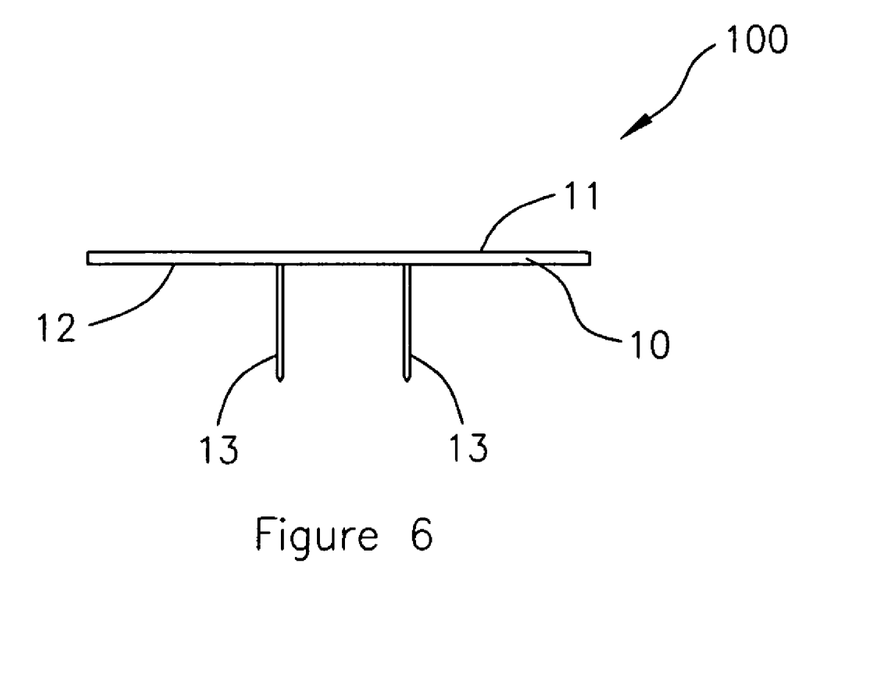
FIG. 6 is a top view of an electrical socket shim plate apparatus, showing the shims projecting from the rear surface of the generally planar member, in accordance with the present invention.

FIG. 6 illustrates, in a top view, an electrical socket shim plate apparatus 100, showing the shims 13 projecting from the rear surface 12 of the generally planar member 10, in accordance with the present invention.

Figure 7:
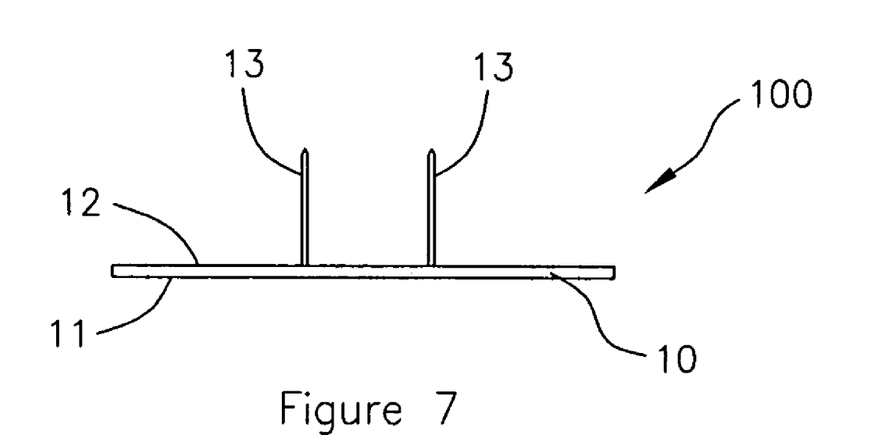
FIG. 7 is a bottom view of an electrical socket shim plate apparatus, showing the shims projecting from the rear surface of the generally planar member, in accordance with the present invention.

FIG. 7 illustrates, in a bottom view, an electrical socket shim plate apparatus 100, showing the shims 13 projecting from the rear surface 12 of the generally planar member 10, in accordance with the present invention.

Figure 8:
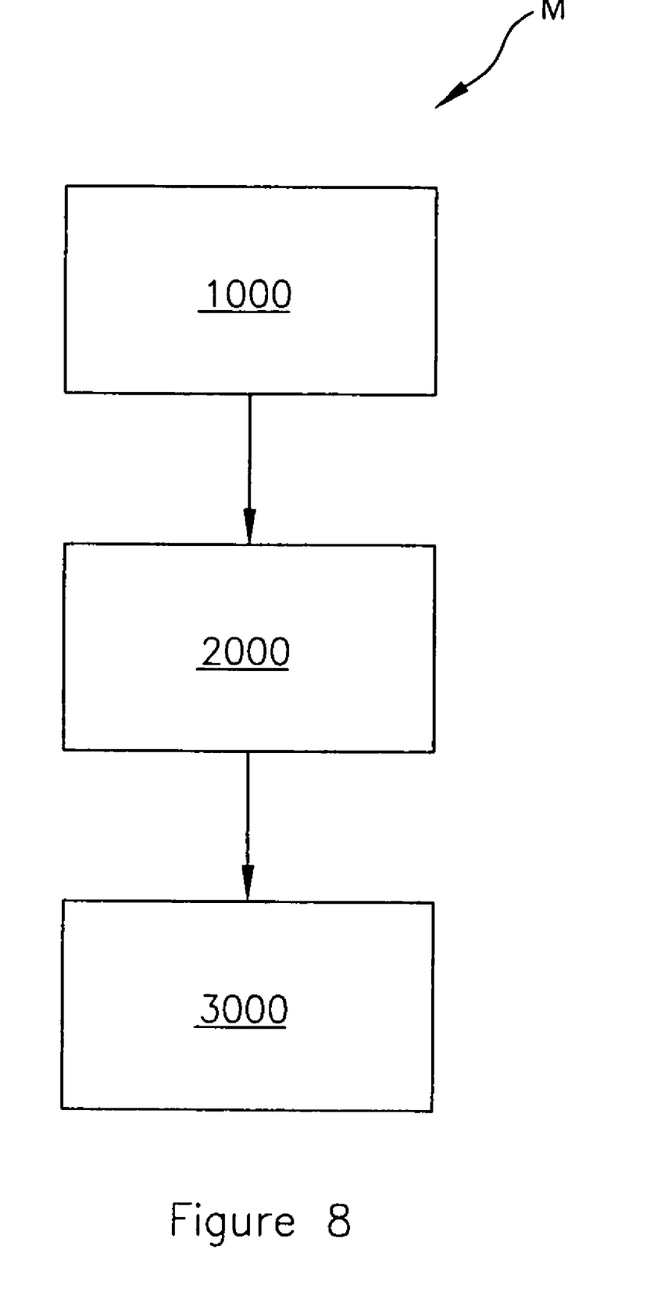
FIG. 8 is a flowchart for a method of fabricating an electrical socket shim plate apparatus, in accordance with the present invention.

FIG. 8 illustrates, in a flowchart, a method M of fabricating an electrical socket shim plate apparatus 100, in accordance with the present invention. The method M comprises the steps of: providing a generally planar member 10 having a front surface 11 and a rear surface 12, as indicated by block 1000; forming a pair of shims 13 on the rear surface 12 as indicated by block 2000; and forming a pair of primary orifices 14 through the generally planar member 10 for accommodating an electrical plug as indicated by block 3000. The step 2000 of forming the pair of shims 13 comprises forming two pairs of shims while the step 3000 of forming the pair of primary orifices 14 comprises forming two pairs of primary orifices. The step 2000 of forming the pair of shims 13 comprises forming a pair of tangs. The step 3000 of forming the pair of primary orifices 14 comprises forming a pair of slots. The step 2000 of forming the pair of shims 13 comprises using a polymer material. The step 1000 of providing the generally planar member comprises using a polymer material. The present method M further comprises the step of forming a tap 15 through the generally planar member 10 for facilitating its fastening to the electrical socket (step not shown in FIG. 8). The present method M further comprises the step of forming a secondary orifice 16 through the generally planar member 10, associated with the pair of primary orifices 14, for accommodating a ground member of the electrical plug. The step 1000 of providing the generally planar member 10 comprises forming a beveled configuration on the front surface. The step 1000 of providing the generally planar member 10 comprises forming a wall-socket conforming configuration on the rear surface 12 which includes forming a perimeter lip 18 which conforms to the shape of a standard wall plate. The step of forming the pair of shims 13 on the rear surface 12, as indicated by block 2000, can also comprise forming ribs 12a and spars 12b for providing additional structural integrity (reinforcement), in an alternative embodiment of the present invention.

Information as herein shown and described in detail is fully capable of attaining the above-described object of the invention, the presently preferred embodiment of the invention, and is, thus, representative of the subject matter which is broadly contemplated by the present invention. The scope of the present invention fully encompasses other embodiments which may become obvious to those skilled in the art, and is to be limited, accordingly, by nothing other than the appended claims, wherein reference to an element in the singular is not intended to mean "one and only one" unless explicitly so stated, but rather "one or more." All structural and functional equivalents to the elements of the above-described preferred embodiment and additional embodiments that are known to those of ordinary skill in the art are hereby expressly incorporated by reference and are intended to be encompassed by the present claims.

Moreover, no requirement exists for a device or method to address each and every problem sought to be resolved by the present invention, for such to be encompassed by the present claims. Furthermore, no element, component, or method step in the present disclosure is intended to be dedicated to the public regardless of whether the element, component, or method step is explicitly recited in the claims. However, various changes and modifications in form, material, and fabrication material detail may be made without departing from the spirit and scope of the inventions as set forth in the appended claims should be readily apparent to those of ordinary skill in the art. No claim herein is to be construed under the provisions of 35 U.S.C. § 112, sixth paragraph, unless the element is expressly recited using the phrase "means for."

INDUSTRIAL APPLICABILITY

The present invention industrially relates to apparatuses and methods for shimming electrical sockets. More particularly, the present invention industrially relates to apparatuses and methods for mechanically shimming electrical sockets. Even more particularly, the present invention industrially relates to apparatuses and methods for mechanically shimming a pair of electrical sockets.

What is claimed is:

1. An apparatus for mechanically shimming at least one electrical socket, the apparatus comprising:
   a generally planar member having a front surface and a rear surface;
   at least one pair of shims being formed on the rear surface; and
   at least one pair of primary orifices being formed through the generally planar member for accommodating at least one electrical plug,
   wherein the at least one pair of shims comprises a plurality of pairs of shims, and
   wherein the at least one pair of primary orifices comprises a plurality of pairs of primary orifices.

2. An apparatus, as recited in claim 1, wherein the at least one pair of shims comprises at least one pair of tangs.

3. An apparatus, as recited in claim 2, wherein the at least one pair of shims comprises a length which is longer than that of a standard electrical plug prong.

4. An apparatus, as recited in claim 3, wherein the at least one pair of shims comprises a length which is ⅛ inch longer than that of a standard electrical plug prong.

5. An apparatus, as recited in claim 1, wherein the at least one pair of primary orifices comprises at least one pair of slots.

6. An apparatus, as recited in claim 1, wherein the at least one pair of shims comprises a polymer material.

7. An apparatus, as recited in claim 1, wherein the generally planar member comprises a polymer material.

8. An apparatus, as recited in claim 1, further comprising at least one tap being formed through the generally planar member for facilitating its fastening to the at least one electrical socket.

9. An apparatus, as recited in claim 8, further comprising at least one fastener being disposed through the at least one tap for fastening the generally planar member to the at least one electrical socket.

10. An apparatus, as recited in claim 9, wherein the at least one fastener comprises a length which is longer than that of a standard wall plate fastener.

11. An apparatus, as recited in claim 10, wherein the at least one fastener comprises a length which is approximately ⅛ inch longer than that of a standard wall plate fastener.

12. An apparatus, as recited in claim 1, further comprising at least one secondary orifice, being formed through the generally planar member and being associated with each at least one pair of primary orifices, for accommodating a ground member of each at least one electrical plug.

13. An apparatus, as recited in claim 1, wherein the front surface comprises a beveled configuration.

14. An apparatus, as recited in claim 1, wherein the rear surface comprises a wall-socket conforming configuration.

15. An apparatus, as recited in claim 14, wherein the wall-socket conforming configuration comprises at least one feature selected from a group consisting essentially of a perimeter lip, a rib, and a spar.

16. A method for mechanically shimming at least one electrical socket, the method comprising the steps of:
   providing a generally planar member having a front surface and a rear surface;
   forming at least one pair of shims on the rear surface; and
   forming at least one pair of primary orifices through the generally planar member for accommodating at least one electrical plug,
   wherein the at least one pair of shims forming step comprises forming a plurality of pairs of shims, and
   wherein the at least one pair of primary orifices forming step comprises forming a plurality of pairs of primary orifices.

17. A method, as recited in claim 16, wherein the at least one pair of shims forming step comprises forming at least one pair of tangs.

18. A method, as recited in claim 17, wherein the at least one pair of shims forming step comprises forming the at least one pair of shims to a length which is longer than that of a standard electrical plug prong.

19. A method, as recited in claim 18, wherein the at least one pair of shims forming step comprises forming the at least one pair of shims to a length which is ⅛ inch longer than that of a standard electrical plug prong.

20. A method, as recited in claim 16, wherein the at least one pair of primary orifices forming step comprises forming at least one pair of slots.

21. A method, as recited in claim 16, wherein the at least one pair of shims forming step comprises using a polymer material.

22. A method, as recited in claim 16, wherein the generally planar member providing step comprises using a polymer material.

23. A method, as recited in claim 16, further comprising the step of forming at least one tap through the generally planar member for facilitating its fastening to the at least one electrical socket.

24. A method, as recited in claim 23, further comprising the step of providing at least one fastener being disposed through the at least one tap for fastening the generally planar member to the at least one electrical socket.

25. A method, as recited in claim 24, further comprising the step of providing at least one fastener having a length which is longer than that of a standard wall plate fastener.

26. A method, as recited in claim 25, wherein the at least one fastener providing step comprises providing the at least one fastener in a length which is approximately ⅛ inch longer than that of a standard wall plate fastener.

27. A method, as recited in claim 16, further comprising the step of forming at least one secondary orifice through the generally planar member, being associated with each at least one pair of primary orifices, for accommodating a ground member of each at least one electrical plug.

28. A method, as recited in claim 16, wherein the generally planar member providing step comprises forming a beveled configuration on the front surface.

29. A method, as recited in claim 16, wherein the generally planar member providing step comprises forming a wall-socket conforming configuration on the rear surface.

30. A method, as recited in claim 29, wherein the wall-socket conforming configuration providing step comprises forming at least one feature selected from a group consisting essentially of a perimeter lip, a rib, and a spar.

* * * * *